March 5, 1929.  O. ANDERSON  1,703,980
SAW ALIGNER
Filed June 21, 1926
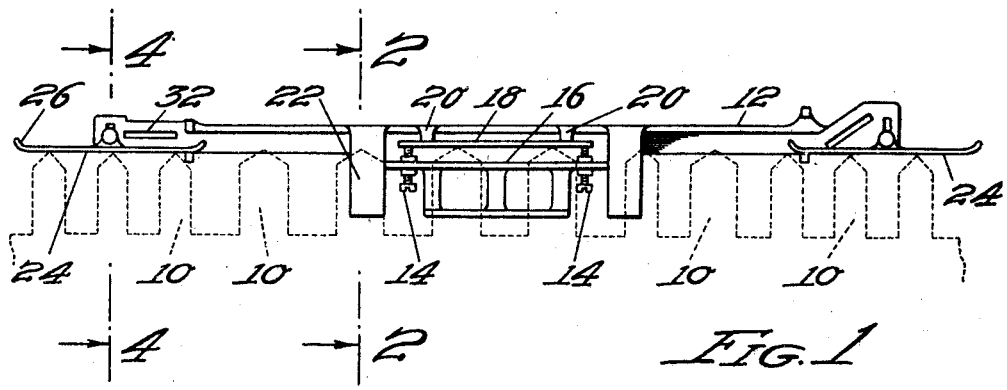
Fig. 1
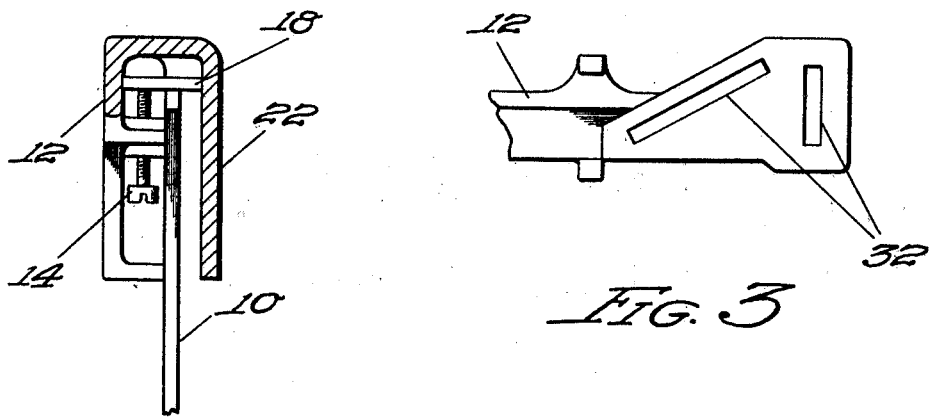
Fig. 2
Fig. 3
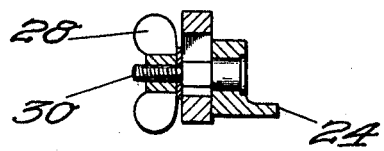
Fig. 4
OSCAR ANDERSON
INVENTOR
PER Albert J. Fihe
ATTORNEY Patented Mar. 5, 1929.

1,703,980

UNITED STATES PATENT OFFICE.

OSCAR ANDERSON, OF PORTLAND, OREGON.

SAW ALIGNER.

Application filed June 21, 1926. Serial No. 117,263.

This invention relates to improvements in saw aligners, and has for one of its principal objects the provision of a means and the method associated therewith, of aligning saw teeth, particularly the teeth of large cross-cut saws as used in lumbering operations.

One of the principal objects of this invention is the perfection of a method whereby the teeth of saws, particularly large cross-cut saws, can be aligned economically and effectively, thereby making such saws more efficient in operation.

Still another important object of this invention is to provide a means and method for both aligning and sharpening saw teeth, whereby the teeth are so cut as to result in a perfectly true curvilinear cutting edge which is especially desired in such saws, but which has heretofore been considered incapable of attainment.

Another and still further important object of this invention is the adaptation of the means and method to use with circular saws so that a perfectly circular cutting edge can be attained.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the novel saw tooth aligner of this invention, showing the same as applied to a saw having a curved cutting edge.

Figure 2 is a sectional view taken on the line 2—2 of Figure 1.

Figure 3 is a detail view showing the construction of the adjusting slots in the end of the saw aligner.

Figure 4 is a sectional view taken on the line 4—4 of Figure 1.

As shown in the drawings:

The reference numerals 10 indicate generally the teeth of a large cross-cut saw or the like ordinarily used in lumbering operations.

Normally the teeth 10 are pointed, as shown, so as to provide a proper cutting edge, and the cutting edge of the saw itself is curvilinear, this being the usual form of construction.

Heretofore, however, the curvilinear cutting edges of such saws have never been formed along a true or perfect curve, as even though the material of the saw were stamped or cut from a perfect pattern the metal in the saw itself warps during the tempering process, thereby resulting in a cutting edge which is more or less wavy or irregular, which naturally impairs the cutting efficiency of the instrument.

This device is adapted to practically automatically remedy such an irregular condition and to enable the operator, by the use of the device and the method, to in a short time perfect a true cutting edge which shall be entirely free from any irregularities or high points.

The device for accomplishing this result comprises essentially a body member or handle 12 which is in the form of a longitudinally extending rod of metal or the like, having at the center thereof a pair of set screws 14 fitted into a ledge 16 integral with the material 12 of the device, and which are adapted to securely clamp in desired operating position a file 18 or other metal cutting instrument. It will be noted that the set screws 14 position the file 18 against suitable stops 20 also formed integral with the handle member 12 of the device, and as pressure is applied to the set screws the file itself will be convexed outwardly at its center, thereby assuming a slightly curved surface, which on account of such curve will readily ride over the points of the saw teeth 10 when the ends of the file come into contact with the points of the saw teeth during the operation of the instrument.

In order that the device be maintained in proper operating position with respect to the saw teeth 10 and also to protect the hands of the operator, a pair of overhanging guards 22 is provided integral with the handle member 12, as best shown in Figure 2 whereby any accidental slipping of the file 18 from the points of the saw teeth will be positively prevented.

In order that the high points of the teeth 10 will be properly filed down to the exact required degree adjustable stops 24 are provided in the form of runners or the like, having upturned ends 26 which ride over the ends of the saw teeth at both sides of the file 18, as best shown in Figure 1.

These runners 24 are adjustably mounted in position in the handle 12 by means of winged nuts 28 fitted on bolts 30, which bolts themselves pass through suitable slots 32 in the ends of the handle members 12.

As best shown in Figure 3, these slots 32 are formed separately and in approximately L shape, having a vertical portion extending at the end of the handle 12 and with the longer arm of the slot extending inwardly and downwardly with respect to the handle itself. This provides for an adjustment of the runner members 24 in practically any direction with respect to the file 18 so as to accommodate the device to various size and shapes of saws, ranging from straight saws to circular ones and enabling the operator to accommodate the device with practically any size of saw within any certain desired range.

The improved method of operating this device will be apparent from the description as the same is set to a saw, beginning with a new saw fresh from tempering, and any high points occurring in the alignment of the teeth will be readily found and may be filed down to any degree within a very small fraction of an inch, and after the entire cutting edge of the saw is gone over in this way a perfectly true alignment of the cutting edges of the saw teeth results, whether it be straight or curvilinear.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A saw aligner, including in combination, a handle member, guard means integral with the handle adapted to fit over the saw teeth on both sides thereof, and attaching means on the handle comprising a bar integral with the guard means and set screws in the bar for retaining a plurality of saw tooth cutting elements in cutting position and for presenting a slightly convex surface of said cutting elements to the said saw teeth, together with adjustable means for determining and maintaining the relation of said cutting elements to the saw teeth, said adjustable means comprising runners pivotally mounted in slots in the ends of the handle.

2. A saw aligner, including in combination, a handle member, guard means integral with the handle, and means on the handle for retaining a saw tooth cutting element in cutting position and for curving said cutting element outwardly at its middle to provide a continuous cutting surface to the saw tooth, and adjustable means for determining and maintaining the relation of said cutting element to the saw tooth, said means comprising runners pivotally mounted in slots in the ends of the handle, two of said slots being positioned at each end of the handle, those at one end comprising a horizontal and a vertical slot respectively and those at the other end comprising a vertically and an angularly disposed slot respectively.

In testimony whereof I affix my signature.

OSCAR ANDERSON.